United States Patent [19]

Günthner

[11] Patent Number: 4,851,022

[45] Date of Patent: Jul. 25, 1989

[54] METHOD AND OVEN FOR CERAMISING GLASS PLATES

[75] Inventor: Franz Günthner, Mainz-Lerchenberg, Fed. Rep. of Germany

[73] Assignee: Schott Glaswerke, Mainz, Fed. Rep. of Germany

[21] Appl. No.: 190,754

[22] Filed: May 5, 1988

[30] Foreign Application Priority Data

May 6, 1987 [DE] Fed. Rep. of Germany ....... 3714970

[51] Int. Cl.$^4$ .............................................. C03B 32/00
[52] U.S. Cl. ......................................... 65/33; 65/117; 65/118; 65/272; 65/273; 432/122; 432/128
[58] Field of Search .................. 65/33, 117, 118, 272, 65/273; 432/122, 128

[56] References Cited

U.S. PATENT DOCUMENTS

| | | | |
|---|---|---|---|
| 760,551 | 5/1904 | Nickerson | 432/128 |
| 802,517 | 10/1905 | Kugel | 432/128 |
| 4,361,428 | 11/1982 | Bartusel et al. | 65/118 |

FOREIGN PATENT DOCUMENTS

| | | |
|---|---|---|
| 1383201 | 2/1975 | United Kingdom . |
| 1383202 | 2/1975 | United Kingdom . |
| 1424526 | 2/1976 | United Kingdom . |

Primary Examiner—Arthur Kellogg
Attorney, Agent, or Firm—Wegner & Bretschneider

[57] ABSTRACT

In a method for ceramising glass plates, in which the plates to be ceramised are hung vertically, a plurality of plates are hung transversely of the transport direction so that they form a plate package. This plate package is passed through a plurality of chambers of an oven in which it is subjected to a direct succession of different temperatures.

7 Claims, 4 Drawing Sheets

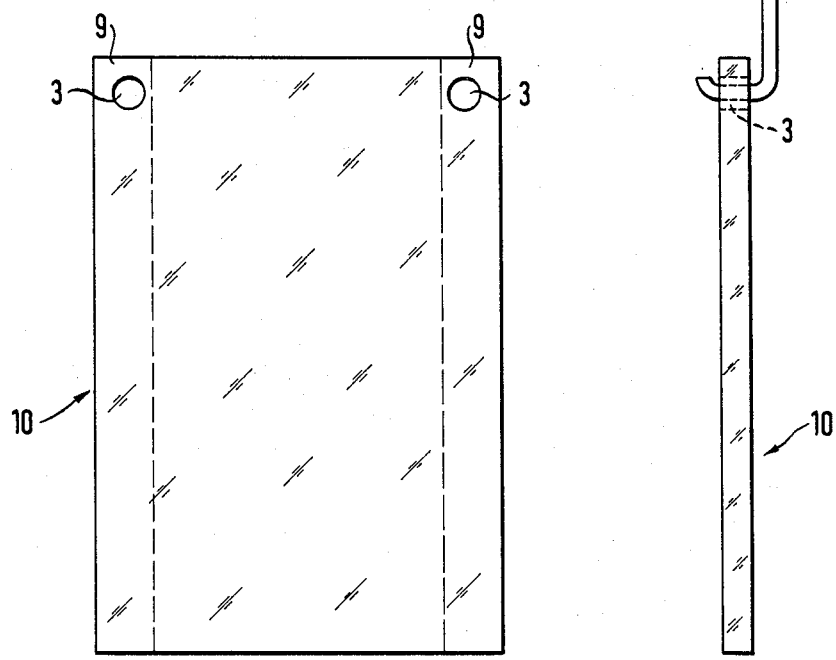

METHOD AND OVEN FOR CERAMISING GLASS PLATES

The invention relates to a method and an oven for ceramising glass plates, with the plates to be ceramised being hung vertically.

When ceramising glass plates by a temperature treatment, it is difficult to achieve high production rates with a tolerable expense without the occurrence of faults or even excessive rejects, particularly in the form of non-uniform ceramisation and/or dimensional changes and/or bending of the plates. According to the prior art, a high uniformity of the temperature treatment was aimed at by hanging the plates in a transport direction with a longitudinal orientation and transporting the plates in this direction through an oven, thus passing the plates successively through zones of different temperatures. A method of this kind is known from the German patent letter No. 36 32 085. The disadvantage was tolerated that with the arrangement of the glass plates lengthwise of the transport direction, the oven necessarily must have a considerable length. A similar method is known from the British patent letter No. 14 24 526. According to that known method, however, the plates may be arranged individually or in a plurality with an orientation lengthwise or transverse of the transport direction. The reported results show that this further method according to the prior art can lead to useful results only in exceptional cases even if the stated method prescriptions are met. Particularly, strong dimensional changes and curvatures of the plates may easily occur. This danger is the greater since this further method according to the prior art prescribes that the heating to a predetermined crystallisation temperature has to be performed at a rate of at least 30° C./min.

It is the object of the invention to provide a method an an oven for ceramising glass plates, by which a high production speed can be achieved with a reduced expense and with improved production results.

According to the invention, that object is attained with respect to the method by a method of ceramising glass plates, including the steps of forming a plate package by hanging a plurality of the plates to be ceramised perpendicularly of a transport direction with mutual distances, passing the plate package in the transport direction through a plurality of chambers of an oven, the chambers being separated from each other and essentially closed by gates, and during the passing, bringing the plate package uniformly to a direct succession of different temperatures by means of flowing hot air, the passing including bringing a subsequent chamber to about the same temperature as the chamber containing the plate package before the plate package is transferred to the subsequent chamber, and temporarily opening the respective gates for the transfer.

In the method according to the invention, a very compact arrangement of the plates is obtained by orienting the plates perpendicularly of the transport direction and by grouping together a plurality of plates to form packages, whereby the structural length of the oven can be reduced to about 5% of the conventional oven length. Despite this strong reduction of the length of the oven, however, a very high uniformity of the temperature treatment is achieved in that the temperature treatment is performed with flowing hot air. It will be appreciated that with flowing hot air, a uniform tempering can be easily obtained even for glass plates in the interior of a package if the flow velocity and the amount of the hot gas are chosen sufficiently large; this is made possible in accordance with the invention in that the individual chambers of the oven are essentially closed and separated from each other by gates, According to the invention, the transfer from one chamber to another is performed without harmful temperature shocks so that even then, faults cannot be produced in the plates. Impairing influences from the heat radiation of the oven walls are avoided because in the method according to the invention the plates are hung perpendicularly of the transport direction.

Preferably, a plurality of plate packages are conducted in the transport direction one after the other through the chambers and simultaneously transferred into a subsequent chamber each. This makes possible a rational cyclic operation in series. In doing so, all gates, including the gates or doors provided at the beginning and the end of the series of chambers, are opened and closed simultaneously, and a first plate package can enter the oven, and a last plate package can leave the oven. In doing so, an optimum utilization of the oven will be obtained if in the transport direction, the chambers are arranged equidistantly and the distance between two plate packages corresponds to the distance between a chamber and the next but one chamber. This mode of operation is possible if the residence times of the plate packages in the individual chambers are equal. Generally, however, the method according to the invention can be designed freely. Particularly, the temperature program can be varied in a suitable manner in correspondence with the glass composition in order to achieve an optimum ceramisation of the glass plates. Also the residence times in the individual chambers can be chosen in correspondence with the glass composition.

For example, the plate package passes through five chambers of an oven in which it is subjected successively to the temperatures $T1 \leq 700°$ C., $T2 = 700°-800°$ C., $T3 = 750°-850°$ C., $T4 = 830°-860°$ C., $T5 \leq 860°$ C. The plate package leaves the last chamber at a temperature of about 700° C. and is then cooled to about 30°-40° C. The heat so obtained may be used for room heating, if desired. The method is not restricted to the said temperature program which only states typical values. In a critical temperature range of particularly 720°-730° C., the glass plate must be heated and cooled across its whole surface as uniformly as possible, with the temperature gradient in the glass being as small as possible, e.g. preferably less than 2-3° C./m. The required temperature changes per unit time can be different in the individual phases of the ceramising process.

With respect to the oven, the said object is attained in accordance with the invention by an oven which comprises a plurality of separately heatable and coolable temperatures zones, the oven being characterised in that for forming the temperatures zones, the oven comprises a plurality of chambers, the chambers each being designed to receive a package of a plurality of glass plates which are vertically hung, at mutual distances, transversely of a transport direction, the chambers being adapted to be heated or cooled by flowing hot air, being essentially closed and separated from each other by movable gates and being temporarily interconnectable by moving the gates away for transferring a plate package from a chamber to an adjacent chamber.

The oven according to the invention permits the performing of different temperature treatments with flowing hot air in the individual temperature zones without a possibility of interference between the chambers. As already stated above, the use of flowing hot air makes it possible to group the plates to packages with relatively small distances; these packages are subjected to the desired temperature treatments in individual chambers. Peferably, the package can consists of 20 plates. The plate distance may be about 5 cm. The plates may be hung by means of tong or hooks. When using hooks, the plates have to be provided with holes in marginal areas, into which the hooks engage. Since glass ceramics can be still cut after ceramisation, which is in contrast to glass which after a hardening can no longer be cut, the marginal areas in which the holes are provided can be conveniently severed off after the ceramisation.

It will be appreciated that in the oven according to the invention, each chamber is associated with measuring, setting and control devices.

The desired uniform distribution of the flowing hot air onto the plates of the plate package can be improved by providing air guiding sheets in the chambers, which sheets are preferably additionally provided with openings. Preferably, each chamber is provided with a blower in the bottom thereof, and the air guiding sheet is shaped as a tube which is arranged in the transport direction and encloses the passing plate packages. In this air guiding sheet, openings are provided in the upper and lower area. The air is sucked by the blower through the lower openings from the interior space surrounded by the air guiding sheet, and is then blown upwards along heating elements which are arranged at the oven wall and heat the air. In the upper area, the heated air enters again the interior space through the openings of the air guiding sheet provided in this area, and flows uniformly along all plates of a plate package being in the interior space. Thereby, it is possible to heat and cool the plates more uniformly from their surfaces, and to keep the temperature differential per unit length in the plate smaller than hitherto.

The air guiding sheet can be also made of ceramic materials.

It is particularly advantageous if the chambers are arranged equidistantly in the transport direction. Thereby, a cyclic serial mode of operation is made possible in which a seres of plate packages is cyclically moved through the chambers.

Preferably, each chamber is dimensioned to receive only one plate package. The gates by which the individual chambers are separated from each other are opened only during the transfer of a plate package into the next chamber.

The invention will be subsequently described at more detail by way of examples in connection with the drawings.

FIG. 4a, 4b illustrates hanging of the plates by means of hooks.

FIG. 1 shows a temperature-time program for a usual glass ceramic composition.

Figure 2:
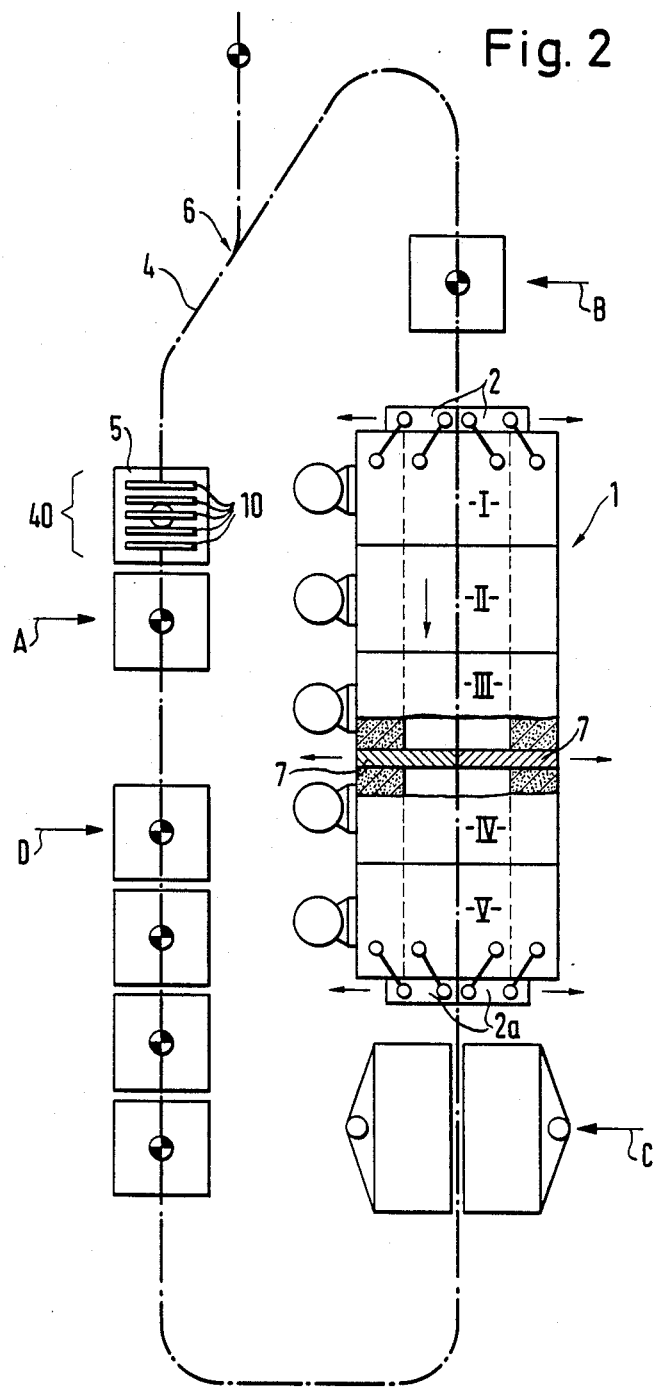
FIG. 2 is a diagrammatic plan view of an oven according to the invention.
Figure 3:
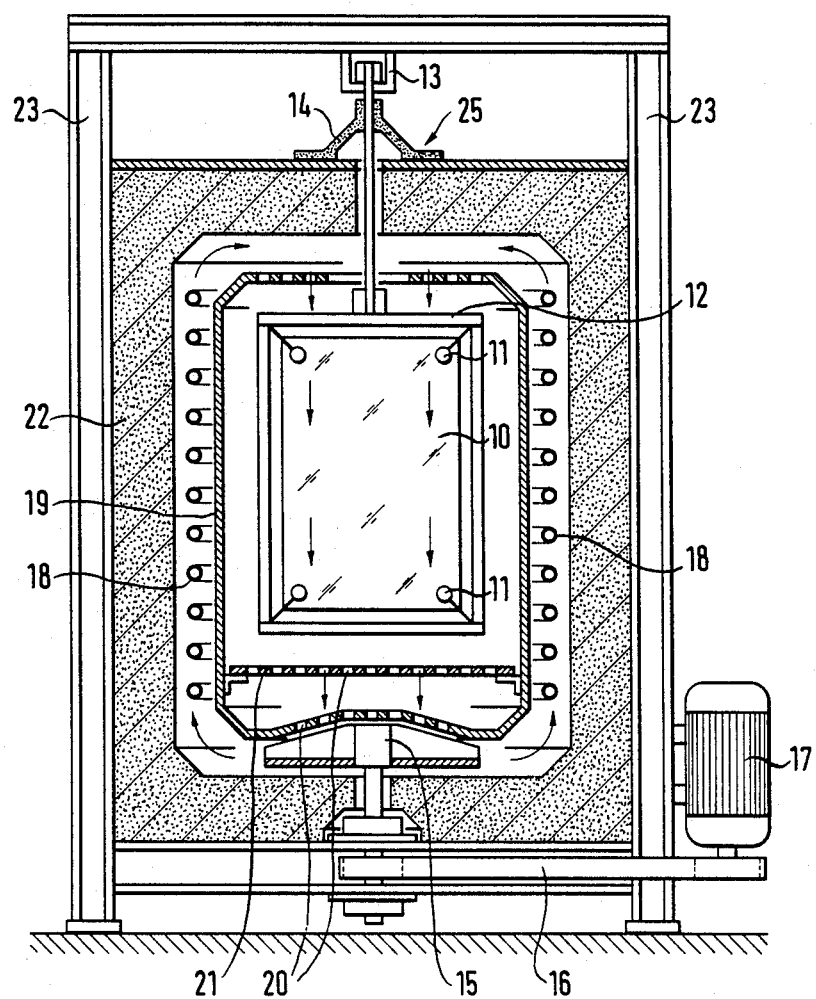
FIG. 3 is a diagrammatic cross-sectional illustration of an oven chamber, normally of the transport direction.

FIGS. 2 and 3 show an oven having five chambers I to V which are separated from each other by gates 7. The outer chambers are closed to the exterior by means of gates or doors 2 and 2a.

For instance, a plate package in the chamber I is heated within about 70 min. to about 700° C. Thereafter the plate package is transferred into the chamber II which has been brought to 700° C. beforehand. There, a heating will take place to about 800° C. within a time of 80 min. Subsequently the plate package is transferred to the chamber III which has been brought to also about 800° C. beforehand. In that chamber III, a further heating to about 850° C. follows within a time of a further 80 min. In chamber IV, the plates are subjected to a constant temperature of about 850° C. over 80 min., and in chamber V, then a cooling takes place over a time period of about 70 min. to a temperature of about 700° C. with which the plates then will leave that chamber.

The residence times stated are only typical values and particularly it is easily possible to apply equal residence times in the chambers whereby a cyclic transfer of a seres of plate packages is made possible. The data stated are only examples; particularly, the plate packages can stay for longer or shorter times in the individual chambers, depending upon the respective ceramisa tion program. Outside of the oven, there will be a cooling to about 30°–40° C., which terminate the ceramising process.

Transport racks each receiving a plate package 40 are moved by means of a transport belt through a conveying path 4 extending through the oven 1. Each package 40 consists of 20 plates which are hung vertically and normally of the transport direction.

Figure 1:
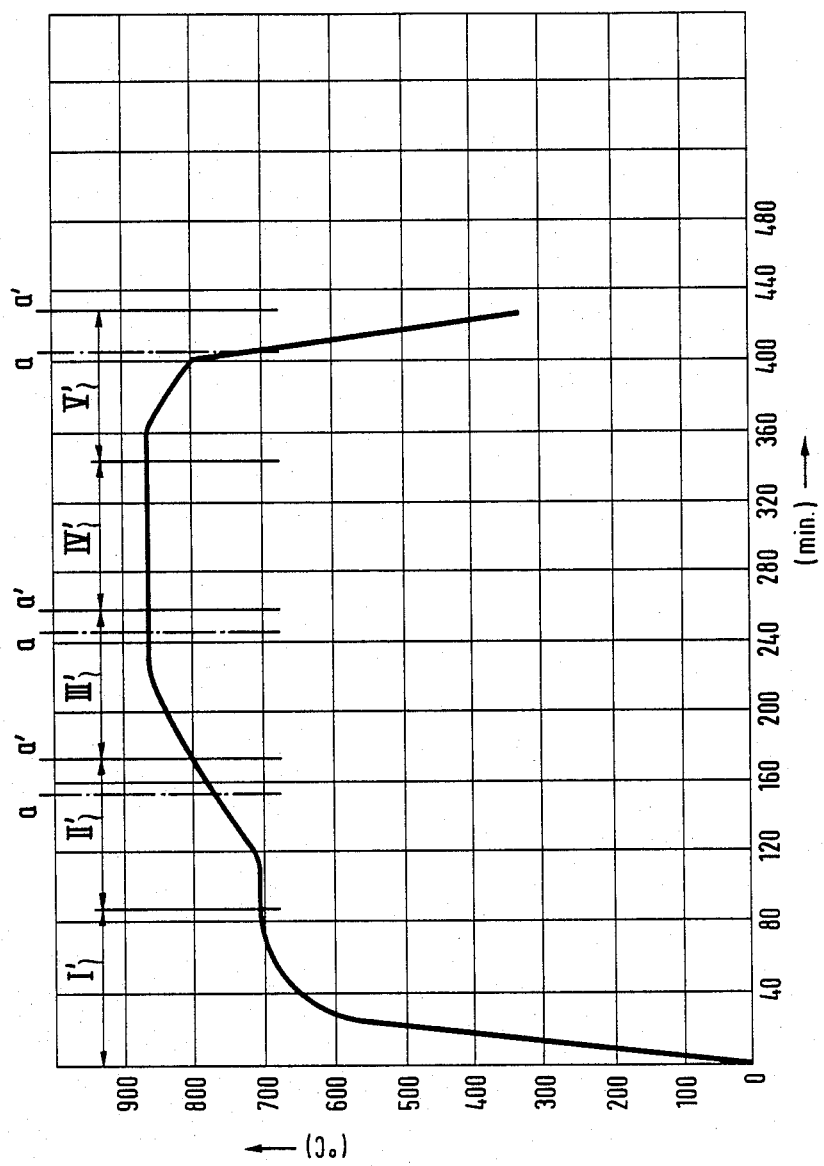
FIG. 1 illustrates a possible temperature-time program with the residence times I', II', . . . of the plates in the individual chambers.

A transport rack is loaded with a plate package 40 in a position A outside of the oven 1 and is then conveyed in the conveying path 4, via a waiting position B, into the chamber I of the oven 1. In doing so, the gates or doors 2 being at the end of the oven 1 are opened only immediately prior to the entering of the plate package and are again closed immediately thereafter. In the chambers I to V, the plates are heated or cooled in accordance with a predetermined program. An example of such a temperaturetime program has been illustrated already in connection with FIG. 1; with the time periods I', II', . . . to be associated with the respective chambers I, II, . . . . Upon a transfer from a chamber to the next one, e.g. from I to II, the temperature of II is beforehand set approximately to the temperature of I. To this end, the chamber II will be emptied for instance at a time point a, after possibly a plate package had been subjected therein to the necessary temperature over the predetermined time period, and the chamber II is cooled in the time period from a to a' to the temperature of the chamber I (in the example FIG. 1 from 800° to 700° C.). To this end, the heating is switched off, and the temperature of the hot air is correspondingly lowered, e.g. by admixing correspondingly cooler air. In doing so, the air circulation will be not interrupted. Subsequently, the plates are transferred from I to II. For the transfer I to II, etc., the gates 7 are opened and again closed. These processes take place correspondingly with all transfers which have to be carried out in critical temperature ranges. From V, the plates are transferred to a position C where they are cooled from about 700° C. to 30°–40° C. The heated air can be used for room heating, if necessary From the position C, the plates are transported via some waiting stations to a position D; there they are removed from the transport rack 5. A switch 6 serves to guide transport racks out of the conveying path 4 or into the conveying path 4.

FIG. 3 shows some details. The transport rack contains an upper part 25 which runs in the rail 13, and a supporting frame 12 into which the plates 10 are hung be means of tongs 11. Sealing elements 14 prevent the exit of the hot air from the oven. The hot air is recirculated in the chamber by means of a blower 15 which is driven via a transmission belt 16 from a motor 17. The air is heated by heating elements 18 and guided between an air guiding sheet 19 and an oven wall. The air guiding sheet 19 is designed tubular and surrounds the whole plate package. The air guiding sheet 19 is slotted in its upper area to permit the passage of the supporting frame 12. Additionally, a plane bottom sheet 21 is secured in the lower area of the air guiding sheet 19, below the plate package. Openings 20 in the air guiding sheet 19 and in the bottom sheet 21 produce a distribution as uniform as possible of the flowing air across the flow cross-section. The oven wall 22 is designed for a heat loss as small as possible and for instance in made in masonry. A rack 23 supports the oven.

FIGS. 4a and 4b illustrate a possible different hanging of the plates 10 in the transport rack, namely, by means of hooks 8 which are hung to the supporting frame 12 and engage through holes 3 which are provided in marginal portions 9 of the plates 10 and for instance may have a diameter of 4 to 6 mm. After the ceramisation, the marginal portions 9 which contain the holes 3 and may have a width of 30–40 mm, are servered off in order to again remove the bores 3.

I claim:

1. A method of ceramising glass plates, including the steps of forming a plate package by hanging a plurality of the plates to be ceramised perpendicularly of a transport direction with mutual distances, passing the plate package in the transport direction through a plurality of chambers of an oven, the chambers being separated from each other and essentially closed by gates, and during the passing, bringing the plate packages uniformly to a direct succession of different temperatures by means of flowing hot air, the passing including bringing a subsequent chamber to about the same temperature as the chamber containing the plate package before the plate package is transferred to the subsequent chamber, and temporarily opening the respective gates for the transfer.

2. The method of claim 1, wherein a plurality of plate packages are successively passed in the transport direction through the chambers and are transferred simultaneously into a subsequent chamber each.

3. The method of claims 2, wherein the chambers are equidistantly arranged in the transport direction, and the distance between two plate packages corresponds to the distance between a chamber and the next but one chamber.

4. An oven for ceramising plates comprising (a) chambers aligned in a transport direction each of which being designed to receive a package of glass plates, and (b) a transport means capable of holding packages of glass plates such that the plates are aligned transversely to the transport direction with a mutual distance between each package and capable of transporting each package through each chamber, the chambers being adapted to be heated or cooled by flowing hot air generated by a heating means, being essentially closed and separated from each other by movable gates and being temporarily interconnectable by moving the gates open for transferring a plate package from a chamber to an adjacent chamber, the adjacent chamber having about the same temperature as the chamber containing the plate package before transferring it.

5. The oven according to claim 4, wherein in each chamber air guiding sheets are arranged for guiding the flowing air so that all plates of a plate package are heated uniformly.

6. The oven according to claim 5, wherein the air guiding sheets are provided with openings.

7. The oven according to claim 4, wherein the chambers are arranged equidistantly in the transport direction.

* * * * *